(12) United States Patent
Thurber (10) Patent No.: US 11,170,446 B1
(45) Date of Patent: *Nov. 9, 2021

(54) SYSTEMS AND METHODS FOR COMMUNICATING WITH AN ELECTRIC VEHICLE

(71) Applicant: STATE FARM MUTUAL AUTOMOBILE INSURANCE COMPANY, Bloomington, IL (US)

(72) Inventor: David W. Thurber, Sherman, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 669 days.

This patent is subject to a terminal disclaimer.

(21) Appl. No.: 14/839,002

(22) Filed: Aug. 28, 2015

Related U.S. Application Data

(60) Provisional application No. 62/069,693, filed on Oct. 28, 2014.

(51) Int. Cl.
*G06Q 40/08* (2012.01)
*B60L 53/00* (2019.01)
(52) U.S. Cl.
CPC .............. *G06Q 40/08* (2013.01); *B60L 53/00* (2019.02)
(58) Field of Classification Search
CPC ..................................................... G06Q 40/08
See application file for complete search history.

(56) References Cited

U.S. PATENT DOCUMENTS

| 6,067,008 | A | 5/2000 | Smith |
| 8,000,858 | B2 | 8/2011 | Tonegawa et al. |

(Continued)

FOREIGN PATENT DOCUMENTS

KR   20110101846 A   *   9/2011

OTHER PUBLICATIONS

Ford Motor Company, Let's Talk: Plug-In Electric Vehicles and Energy Companies Are About to Start Communicating via the Cloud. @FordOnline, Jul. 29, 2015 [online], [retrieved on Aug. 28, 2015]. Retrieved from the Internet <URL: http://www.at.ford.com/news/en/Pages/Let%E2%80%99s%20Talk%20Plug-In%20Electric%20Vehicles%20and%20Energy%20Companies%20Are%20About%20to%20Start%20Communicating%20via%20the%20Cloud.aspx>.

*Primary Examiner* — Bennett M Sigmond
*Assistant Examiner* — Xavier M. Bennett
(74) *Attorney, Agent, or Firm* — Marshall, Gerstein & Borun LLP (57) ABSTRACT

Methods and systems for communicating data with an electric vehicle are disclosed. According to some aspects, insurance risk related data associated with use of the electric vehicle may be collected and stored in one or more memories included in the electric vehicle. When the electric vehicle is connected to an electrical grid for charging a battery included in the electric vehicle, in some implementations, a power-line communication unit may transmit the insurance risk related data over the electrical grid to one or more remote computer systems. The insurance risk related data may be used by an insurer to calculate insurance rating data so that an insurance premium (or rate, discount, usage-based insurance, etc.) associated with the electric vehicle and/or its driver can be adjusted to more accurately reflect a risk of recognizable loss. The insurance risk data may be related to driving or driving behavior, and/or vehicle operation.

22 Claims, 3 Drawing Sheets

(56) References Cited

U.S. PATENT DOCUMENTS

| | | | | |
|---|---|---|---|---|
| 8,090,598 | B2* | 1/2012 | Bauer | G06Q 40/02 |
| | | | | 705/4 |
| 8,421,592 | B1* | 4/2013 | Gunasekara | H04L 63/18 |
| | | | | 340/5.74 |
| 8,463,472 | B2 | 6/2013 | Watanabe | |
| 8,541,903 | B2 | 9/2013 | Burk | |
| 8,725,551 | B2* | 5/2014 | Ambrosio | G06Q 30/02 |
| | | | | 705/7.31 |
| 2010/0082464 | A1* | 4/2010 | Keefe | G06Q 10/06 |
| | | | | 705/32 |
| 2012/0119701 | A1 | 5/2012 | Igata | |
| 2012/0221703 | A1 | 8/2012 | Schwager et al. | |
| 2012/0259665 | A1* | 10/2012 | Pandhi | B60L 53/68 |
| | | | | 705/4 |
| 2013/0041854 | A1* | 2/2013 | Littrell | B60L 53/30 |
| | | | | 705/412 |
| 2014/0039726 | A1* | 2/2014 | Profitt-Brown | G07C 5/008 |
| | | | | 701/2 |
| 2015/0112730 | A1 | 4/2015 | Binion et al. | |

* cited by examiner

FIG. 3

SYSTEMS AND METHODS FOR COMMUNICATING WITH AN ELECTRIC VEHICLE

CROSS-REFERENCE TO RELATED APPLICATION

This application claims benefit of the filing date of U.S. Provisional Patent Application No. 62/069,693, filed Oct. 28, 2014. The content of U.S. Provisional Patent Application No. 62/069,693 is expressly incorporated herein by reference in its entirety.

FIELD OF DISCLOSURE

The present disclosure relates generally to vehicle communication methods and systems, and more particularly, to communicating insurance risk related data with an electric vehicle.

BACKGROUND

Vehicle insurance providers typically seek to offer insurance policy premiums that take into account the likelihood of an event triggering a recognizable loss under the insurance policy (e.g., damage to the vehicle covered by the policy, damage to another vehicle or object, injury to the policy holder, injury to others, etc.). Past driving behavior of a policy holder may be useful in determining whether a recognizable loss will occur in the future. For example, an individual who routinely drives his or her vehicle above the speed limit may be more likely to incur a recognizable loss than an individual who generally does not exceed the speed limit. Other factors which may be useful in determining the risk of recognizable loss include the distance that the vehicle is driven on a daily, weekly, monthly and/or yearly basis, the general condition of the vehicle, and/or the locations in which the vehicle has been driven (e.g., urban, rural, off-road, etc.).

Typically, individuals who demonstrate driving behaviors indicative of a low risk of recognizable loss may be assigned a more positive insurance rating, and accordingly, offered a lower insurance premium. On the other hand, individuals demonstrating driving behaviors associated with a high risk of loss may be assigned a more negative rating, and therefore, offered a higher insurance premium, for the same level of coverage.

Insurance providers typically may not have access to very much information regarding the driving behavior and vehicle condition of their current and/or potential policy holders. Sources of such information may be limited to driving records and/or responses by the current and/or potential policy holder to questionnaires administered by the insurance provider. Moreover, some driving behaviors, particularly those that have a significant impact on the risk of recognizable loss, may be difficult, if not impossible, to assess based upon driving records, questionnaires, and/or other conventional techniques for learning driver behaviors. Consequently, insurance ratings and premiums may not accurately reflect the policy holder's true risk of loss.

SUMMARY

A system and method that may communicate data with an electric vehicle (such as either a fully electric vehicle or a hybrid electric vehicle) over an electrical grid when the electric vehicle is connected to an electrical grid for charging are provided. As a result, the electric vehicle may advantageously communicate insurance risk related data with an insurer and/or other remote entity over the electrical grid without having to connect to a wireless network (e.g., a cellular network). Additionally, the insurer may advantageously collect insurance risk related data from the electric vehicle on a relatively regular basis (e.g., whenever the electric vehicle is connected to the electrical grid for charging).

In one aspect, a computer-implemented method of communicating data with an electric vehicle may be provided. The method may include collecting insurance risk related data associated with use of the electric vehicle, such as via one or more vehicle-mounted processors. Additionally, the method may include storing, such as under the direction of the one or more vehicle-mounted processors, the insurance risk related data in one or more memories included in the electric vehicle. The method may further include receiving an indication (such as at or via the one or more vehicle-mounted processors) that the electric vehicle is connected to an electrical grid for charging a battery included in the electric vehicle. Furthermore, the method may include transmitting the insurance risk related data with or from a power-line communication unit (and/or under the control or direction of the one or more vehicle-mounted processors) over the electrical grid from the electric vehicle to one or more remote servers when the electric vehicle is connected to the electrical grid for charging the battery. The method may include receiving the insurance risk related data at an insurance provider remote processor, and/or generating, adjusting, or updating an insurance policy, premium, rate, risk, discount, or reward, and/or usage-based insurance, for the electric vehicle at the insurance provider remote processor based upon the insurance risk related data received from the electric vehicle to facilitate insurance product pricing that is more reflective of true or actual risk. The method may include additional, fewer, or alternate actions, including those discussed elsewhere herein.

In another aspect, a system of communicating data with an electric vehicle may be provided. The system may include one or more processors and one or more memories connected to the one or more processors (such as vehicle-mounted processors and memories). The one or more memories may include non-transitory computer-readable instructions that, when executed by the one or more processors, cause the one or more processors to: collect insurance risk related data associated with use of the electric vehicle; store the insurance risk related data in the one or more memories; receive an indication that the electric vehicle is connected to an electrical grid for charging a battery included in the electric vehicle; and/or control a power-line communication unit to transmit the insurance risk related data over the electrical grid (from the electric vehicle) to one or more remote servers. The one or more remote servers may be associated with an insurance provider, and the insurance risk related data may be used to generate or adjust an insurance policy (and/or premium, discount, rate, usage-based insurance, etc.) for the electric vehicle. The system may include additional, fewer, or alternate components, including those discussed elsewhere herein.

In another aspect, a tangible computer-readable medium including non-transitory computer-readable instructions that, when executed at one or more processors of a communication system for an electric vehicle, cause the one or more processors to: collect insurance risk related data associated with use of the electric vehicle; store the insurance risk related data in one or more memories included in the electric vehicle; receive an indication that the electric vehicle is connected to an electrical grid for charging a battery included in the electric vehicle; and/or transmit the insurance risk related data with a power-line communication unit over the electrical grid to one or more remote servers when the electric vehicle is connected to the electrical grid for charging the battery such as adjustments to an insurance policy for the electric vehicle is facilitated. The computer-readable medium may include instructions that direct additional, less, or alternate functionality, including that discussed elsewhere herein.

BRIEF DESCRIPTION OF THE DRAWINGS

There are shown in the drawings arrangements which are presently discussed, it being understood, however, that the present embodiments are not limited to the precise arrangements and instrumentalities shown, wherein.

The Figures depict preferred embodiments of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

The systems and methods disclosed herein generally relate to communicating insurance risk related data, among other types of data, with and/or from an electric vehicle over an electrical grid by way of power-line (and/or wired) communication. The electric vehicle may include various processors and/or sensors that collect various types of information related to vehicle and/or driver risk, such as data indicating driving or driver behavior and/or vehicle operation. The insurance risk related data may be transmitted from the electric vehicle via the electrical grid to an insurance provider remote processor (or server). The insurance provider remote processor may then use the insurance risk related data to generate or adjust an insurance policy (and/or insurance premium, rate, discount, points or rewards program, etc.) for the electric vehicle and/or the owner or driver(s) of the electric vehicle. As such, more accurate levels of risk, or lack thereof, may be determined for the electric vehicle and/or drivers thereof, and insurance cost savings may be calculated and passed on to risk averse drivers.

More specifically, power-line communication systems may provide the ability to carry data on a conductor that may be also used to distribute AC and/or DC electric power. The infrastructure necessary to support power-line communications has become more widespread, in part, due to the recent interest in transforming the electrical grid into a smart grid. Electric vehicles may be periodically plugged into the electrical grid to charge their batteries. The systems and methods of the present disclosure take advantage of the recent adoption of power-line communication technologies, and the growing popularity of electric vehicles, to provide insurance companies, and other entities, with the ability automatically to collect data from an electric vehicle when it is connected to the electrical grid for charging.

The systems and methods of the present disclosure may utilize existing onboard data collection systems that collect insurance risk related data from one or more sensors and/or subsystems onboard a vehicle. Additionally, or alternatively, the insurance risk related data may be collected from one or more aftermarket data collection systems and/or one or more aftermarket sensors installed in the vehicle post-production by, for example, the purchaser of the vehicle or another individual who is not the vehicle manufacturer. The insurance risk related data may reflect information generated by any of various devices and subsystems of an electric vehicle, such as devices that monitor and/or control operational parameters of the vehicle (e.g., velocity, braking, steering, acceleration, odometer information, tire pressure, engine performance, revolutions per minute, whether a cruise control may or other automated driving system is activated, etc.), diagnostic systems (e.g., a battery charge level sensor, a motor temperature sensor, oil level sensor, etc.), devices that sense and/or monitor characteristics of the environment external to the vehicle (e.g., still image cameras, video cameras, lidar, radar, etc.), devices that monitor the driver and/or passengers inside the cabin of the vehicle (e.g., still image cameras, video cameras, microphones, seat occupant sensors, temperature sensors, etc.), and/or navigational devices (e.g., dedicated onboard global position systems, mobile phones with applications that locate the mobile phone using GPS or cell tower triangulation, etc.), etc. In one embodiment, the onboard data collection system may be similar to that described in U.S. patent application Ser. No. 14/057,419, the entirety of which is hereby incorporated by reference.

By transmitting the data collected by these onboard sensors and/or systems to an insurance provider, the systems and methods of the present disclosure may help the insurance provider more accurately predict the likelihood of a policy holder causing and/or suffering damage with his or her vehicle. This knowledge may enable the insurance provide to assign an insurance rating to the policy holder that better approximates the risk of recognizable loss and/or adjust an insurance premium to more accurately reflect the risk of recognizable loss.

Furthermore, the systems and methods of the present disclosure may free the policy holder from having to transmit the insurance risk related data via his or her mobile phone and/or installing a wireless communication unit in his or her vehicle for wirelessly transmitting the insurance risk related data. Additionally, since an electric vehicle may be connected to the electrical grid for charging on a fairly regular basis (e.g., daily, weekly, monthly, etc.), an insurance provider may be able to collect relatively up-to-date insurance risk related data on the policy holder. Also, the systems and methods of the present disclosure may be automated so that the collection of the insurance risk related data may occur without any substantive action by the policy holder.

I. Conventional Technologies

Wireless communication technologies have made it feasible to remotely access sensor data collected by an onboard computer of a vehicle. However, such systems typically may require the use of a mobile phone to wirelessly transmit the data to the insurance provider and/or the installation of a wireless communication unit in the vehicle. Also, depending upon the location of the vehicle, it may be difficult to establish a wireless connection with the vehicle (e.g., when the vehicle is parked in an underground parking garage where the available wireless signal may be weak). Additionally, configuring the vehicle to have internet access may require the owner to purchase a relatively expensive data plan from a wireless (e.g., cellular) provider for the vehicle. Thus, while obtaining data from the onboard computer of the vehicle through wireless communications may be possible, it may sometimes not be a very economic and/or a reliable option for collecting such information.

One method for wirelessly transmitting the onboard computer data may be to physically and/or wirelessly connect a mobile phone to the onboard diagnostics communication port so that the mobile phone may retrieve the sensor data saved on the onboard computer and/or then wirelessly transmit the data to the insurance provider. However, many electric vehicles (e.g., a battery electric vehicle, a plug-in hybrid electric vehicle, an extended-range electric vehicle, etc.) lack an easily accessible onboard diagnostics communication port. This may be because onboard diagnostics communication ports are generally included for emissions testing purposes, and electric vehicles typically may not be subjected to such testing. Accordingly, collecting sensor data from the onboard computer of an electric vehicle may not be as straightforward as collecting such data from a conventional internal combustion engine vehicle. The present embodiments may alleviate these and/or other deficiencies.

II. Exemplary Environment for Communicating with an Electric Vehicle

Figure 1:
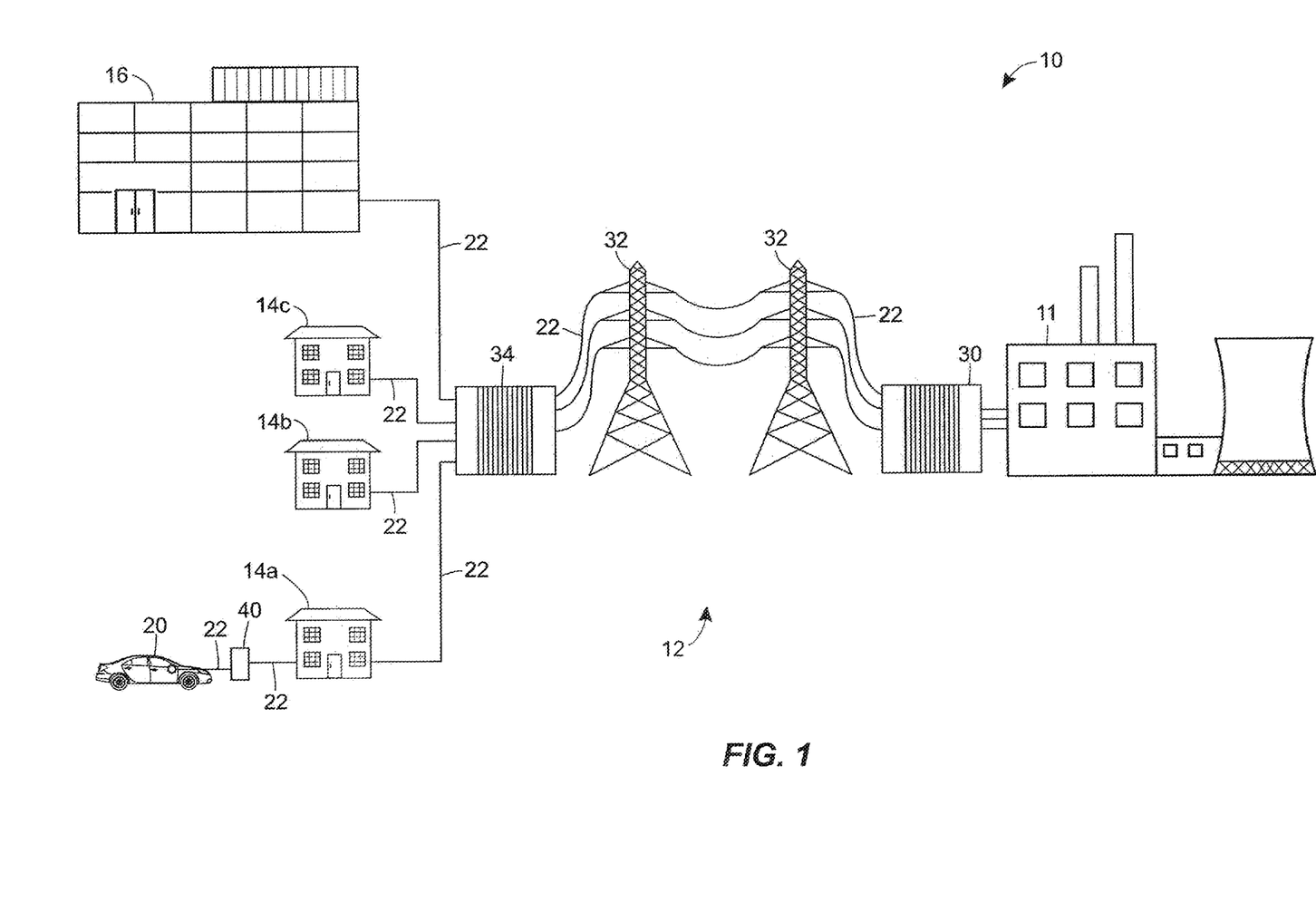
FIG. 1 illustrates an exemplary environment associated with communicating insurance risk related data with an electric vehicle in accordance with principles of the present disclosure.

FIG. 1 depicts an exemplary environment 10 associated with communicating insurance risk related data with, and/or from, an electric vehicle. Although FIG. 1 depicts certain components and systems, it will be appreciated that additional or alternate components and systems are envisioned.

As illustrated in FIG. 1, the environment 10 may include a power station 11 that supplies electricity to various consumers via an electrical grid 12. The consumers may include residential buildings such as homes 14a, 14b, 14c, businesses such as an insurance provider 16, vehicles such as an electric vehicle 20, and/or other electricity consuming devices, systems, and entities.

The power station 11 may generate electricity by using a generator to convert mechanical or chemical energy into electrical energy. The power station 11 may be a thermal power station that harnesses energy from fossil fuels such as coal and natural gas, radioactive materials, waste heat from industrial processes, etc. Alternatively, the power station 11 may harness energy from renewable sources such as hydropower, solar, wind, geothermal, biomass, etc. Several different types of power stations may supply electricity to the electrical grid 12.

The electrical grid 12 may be an interconnected network for transmitting electricity from the power station 11 to the consumers. The electrical grid 12 may include multiple power lines 22 for transmitting the electricity over long distances. The power lines 22 may be made of a conductive material such as copper. Some of the power lines 22 may be low-voltage distribution lines that deliver electricity directly to individual consumers, and some of the power lines 22 may be high-voltage transmission lines that carry electricity over long distances.

The electrical grid 12 may include one or more step-up transformers 30 which increase the voltage of the electricity produced by the power station 11 so that the electricity can be transmitted over long distances with minimal resistance power losses. The electrical grid 12 may also include step-down transformers 34 which may reduce the voltage of the electricity after a long-distance transmission so that the electricity is suitable for use by the consumer. Additionally, the electrical grid 12 may include transmission towers 32 which may hold the power lines 22 above the ground. The power lines 22 may also be buried underground.

The electric vehicle 20 may be any vehicle that is propelled by one or more electric motors which use electricity stored in a battery or another electrical storage device. The electric vehicle 20 may be a battery electric vehicle, plug-in hybrid electric vehicle, hybrid electric vehicle, extended-range electric vehicle, rail-borne electric vehicle, etc. Furthermore, the electric vehicle 20 may be configured for use as a car, crossover vehicle, sports utility vehicle, truck, train, boat, submarine, construction vehicle, heavy-equipment-type vehicles, motorcycle, scooter, bicycle, self-balancing two wheel vehicle, plane, helicopter, drone, etc.

The electric vehicle 20 may be connected to the electrical grid 12 via a charging device 40 installed near the home 14a. The charging device 40 may shorten the time necessary to charge the battery of the electric vehicle 20 as compared to connecting the electric vehicle 20 directly to the electrical grid 12.

III. Exemplary Data Collection and Communication System

Figure 2:
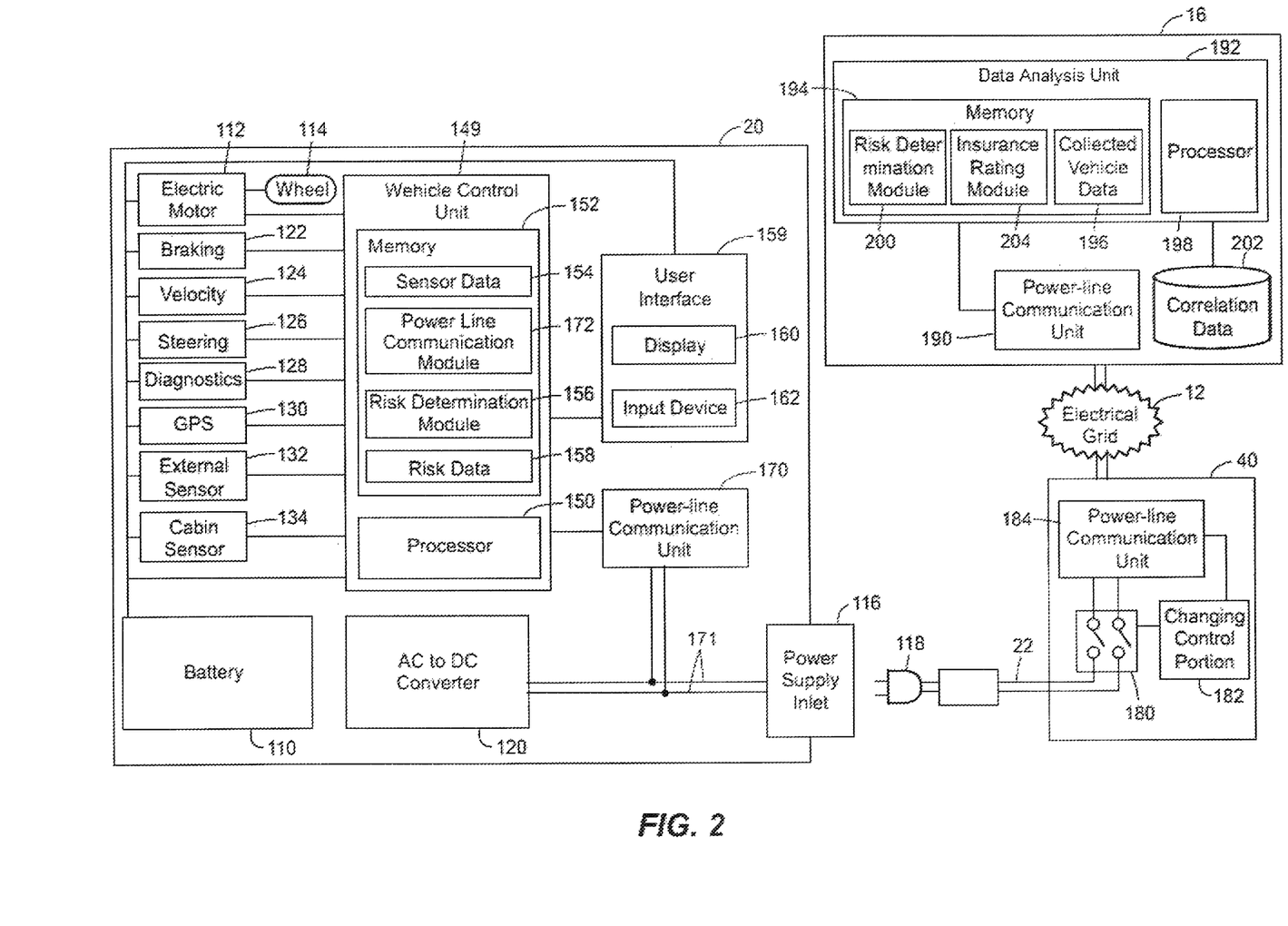
FIG. 2 depicts a block diagram illustrating an exemplary computer system on which a method of communicating insurance risk related data with an electric vehicle may operate in accordance with principles of the present disclosure.

FIG. 2 is a block diagram of an exemplary system for collecting and processing data obtained from the electric vehicle 20 for various insurance-related purposes and/or other purposes. The electric vehicle 20 may include a battery 110 and/or other electrical storage apparatus that stores electricity, and, during operation, supplies electricity to one or more electric motors 112 that rotate wheels 114 of the electric vehicle 20. Various onboard sensors and/or subsystems may be arranged within and/or on the exterior of the electric vehicle 20 for collecting insurance risk related data associated with use of the vehicle. When the electric vehicle 20 is connected to the electrical grid 12 for charging the battery 20, the electric vehicle 20 may communicate the collected insurance risk related data via a power-line communication protocol over the electrical grid 12 to the insurer 16. In one aspect, the insurance risk related data may be analyzed prior to transmission to the insurer 16, and in another aspect, un-processed insurance risk related data may be transmitted to the insurer 16 for analysis.

The electric vehicle 20 may include a power supply inlet 116 removably connectable to an electrical plug 118 for charging the battery 110 with electricity from the electrical grid 12. AC voltage received from the electrical plug 118 may be converted into DC voltage by an AC to DC converter 120 located inside the electric vehicle 20. The AC to DC converter 120 may output DC voltage to the battery 110 for storage. The electric vehicle 20 may include additional, fewer, or alternate components than those shown in FIG. 2, including those discussed elsewhere herein.

A. Exemplary Data Collection Systems

The electric vehicle 20 may include hardware, firmware, and/or software subsystems that monitor and/or control various operational parameters of the electric vehicle 20. In the electric vehicle 20 of FIG. 2, a braking subsystem 122 may generate data indicative of how the brakes of the electric vehicle 20 are applied (e.g., an absolute and/or relative measure of applied braking force, and/or a binary indicator of whether the brakes are being applied, etc.), a velocity subsystem 124 that may generate data indicative of how fast the electric vehicle 20 is being driven (e.g., corresponding to a velocity, odometer reading, and/or a driver input such as depression of a gas pedal, etc.), a steering subsystem 126 that may generate data indicative of how the electric vehicle 20 is being steered (e.g., based upon the driver's manipulation of a steering wheel, and/or based upon automated steering control data, etc.), and/or a diagnostics subsystem 128 that may generate other data pertaining to the operation and/or condition of the electric vehicle 20 (e.g., battery charge information, electric motor temperature information, engine oil level information, warning information to indicate dangerous and/or improper operation, and/or error codes to indicate software and/or hardware malfunctions within vehicle 20 such as airbag malfunctions, etc.).

The electric vehicle 20 may also include a GPS subsystem 130 that generates geographic location information (e.g., data indicative of a current location of the electric vehicle). In one aspect, the GPS subsystem 130 may employ positioning techniques different from GPS, such as cell tower triangulation, for example, for generating the geographic location information.

In one aspect, the braking subsystem 122, velocity subsystem 124, steering subsystem 126, diagnostics subsystem 128, and/or a different subsystem not shown in FIG. 2 also may generate data indicating whether one or more automated driving systems are currently activated for the electric vehicle 20. For example, the velocity subsystem 124 may generate data indicating whether a cruise control system is currently activated, and, for example, the braking subsystem 122 and/or the steering subsystem 126 may generate data indicating whether assisted steering and/or assisted braking systems are currently activated. In other examples, one of the subsystems 122, 124, 126, 128 and/or a combination of the subsystems 122, 124, 126, 128 may generate data indicating whether the electric vehicle 20 is in an automated transmission mode or a manual transmission mode, and/or whether the driving of the electric vehicle 20 is currently subject to complete automated/machine control rather than manual (human) control, etc.

In yet another example, one of the subsystems 122, 124, 126, 128 and/or a combination of the subsystems 122, 124, 126, 128 may generate data indicative of motion of the electric vehicle 20 relative to all six degrees of freedom (i.e., forward/backward, up/down, left/right, pitch, yaw, and roll). For example, the generated data may indicate translational and/or rotational G-forces (e.g., using accelerometers), which may be used to deduce directional velocity and/or acceleration with respect to each degree of freedom.

In still further examples, one of the subsystems 122, 124, 126, 128 and/or a combination of the subsystems 122, 124, 126, 128 may generate data indicative of odometer information, steering information, driver behavior information, velocity information, braking information, engine performance information, and/or vehicle maintenance information (e.g., oil change information, air filter replacement information, etc.).

The electric vehicle 20 may also include at least one external sensor 132. The external sensor 132 may be a device configured to monitor characteristic(s) of the environment external to the vehicle 20, such as a still image and/or video camera device, a lidar (laser remote sensing) device, a radar device, and/or a sonar device, etc. The external sensor 132 may be located on or inside the electric vehicle 20.

For example, the external sensor 132 may be permanently affixed to the electric vehicle 20 (e.g., on the exterior and/or interior of the frame, on the dashboard, on the inner or outer surface of a windshield, etc.), or may be temporarily affixed to, or simply placed on or in, some portion of the electric vehicle 20 (e.g., placed on top of the dashboard, or in a device holder affixed to the windshield, etc.). The external sensor 132 may be included in a portable computing device (e.g., as a software application and/or associated hardware of a mobile phone or other portable computer device), and/or may be a dedicated sensor device.

In the electric vehicle 20 shown in FIG. 2, the external sensor 132 may be located on or inside the electric vehicle 20 such that it senses the environment in front of, behind, to the side, and/or above the electric vehicle 20. In one aspect, the external sensor 132 may be used in combination with other external sensors to provide a 360 degree sensing range. In other embodiments, however, the external sensor 132 may be omitted.

In one aspect, the external sensor 132 and/or other external sensors may generate data indicative of proximity information (e.g., the distance by which the electric vehicle 20 follows another vehicle), drifting information (e.g., how often the electric vehicle 20 drifts from its lane), lane changing information (e.g., how frequent the electric vehicle 20 changes lanes), weather information (e.g., whether the electric vehicle 20 is driven in rain, sleet, snow, high wind conditions, low temperatures, high temperatures, etc.). In one aspect, the external sensor 132 and/or other external sensors may generate data indicative of an amount of time the vehicle 20 has been exposed to cold temperatures (e.g., below 0° Celsius), so that such data may be used to calculate the impact of cold temperatures on the charge level of the battery of the vehicle 20 and/or the condition of other components of the vehicle 20. In one aspect, the battery charge determined to have been lost to cold temperatures may be communicated to the driver through the dashboard or the driver's smartphone, and/or communicated to a third party via the power-line communication system disclosed herein.

The electric vehicle 20 may further include at least one cabin sensor 134. The cabin sensor 134 may be a device configured to monitor aspects of the cabin of the electric vehicle 20 and/or the occupants inside the cabin of the vehicle 20. The cabin sensor 134 may be any one of, for example, a still image camera, video camera, microphone, seat occupant sensor, temperature sensor, etc.

The cabin sensor 134 may be permanently affixed inside the cabin of the vehicle 20 (e.g., on the dashboard, on the inner side of a windshield, inside one of the seats, etc.), or may be temporarily affixed to, or simply placed on or in, some portion of the interior of electric vehicle 20 (e.g., placed on top of the dashboard, arranged in a device holder affixed to the windshield, etc.).

The cabin sensor 134 may track eye movement of the driver to determine if the driver is distracted, sleeping, and/or not looking at the road. The cabin sensor 134 may be included in a portable computing device (e.g., as a software application and associated hardware of a mobile phone and/or other portable computer device), and/or may be a dedicated sensor device.

In one aspect, the cabin sensor 134 may be used in combination with other cabin sensors. In other embodiments, however, the cabin sensor 134 may be omitted. In one aspect, the cabin sensor 134 and/or other cabin sensors may generate data indicative of driver behavior information (e.g., whether the driver is distracted, sleeping, not looking at the road, etc.) and/or passenger information (e.g., number of passengers, passenger weight, passenger age, passenger behavior, etc.).

Each of the subsystems 122, 124, 126, 128, 130, the external sensor 132, and the cabin sensor 134 may generate data and/or analog information that may be indicative of the sensed environment. For example, where the external sensor 132 is a digital video camera device, the external sensor 132 may generate data corresponding to frames of captured digital video. As another example, where the external sensor 132 is an analog camera device, the external sensor 132 may generate analog signals corresponding to frames of captured analog video. As yet another example, where the external sensor 132 is a digital lidar device, the external sensor 132 may generate data corresponding to frames of captured digital lidar information.

In one aspect where the external sensor 132 is a digital video camera device, for example, the external sensor 132 may generate data corresponding to frames of captured digital video. As another example, where the external sensor 132 is an analog camera device, external sensor 30 may generate analog signals corresponding to frames of captured analog video. As yet another example, where the external sensor 132 is a digital lidar device, the external sensor 132 may generate data corresponding to frames of captured digital lidar information In one aspect, the electric vehicle 20 may not include one or more of the subsystems 122, 124, 126, 128, 130, the external sensor 132, and the cabin sensor 134, and/or the vehicle 20 may include additional sensors or subsystems not depicted in FIG. 2. Moreover, one or more of the subsystems and/or sensors may be included in a portable external computing device such as a mobile phone. For example, the GPS subsystem 130 may include a software application running on a mobile phone that includes appropriate hardware for executing the application (e.g., an antenna and/or a receiver).

The electric vehicle 20 may also include a vehicle control unit 149 including at least one processor 150 configured to receive data analog signals from the subsystems 122, 124, 126, 128, 130, the external sensor 132, and/or the cabin sensor 134 and/or other subsystems and/or sensors. The processor 150 may collect the data and/or analog signals substantially in real time, and/or in any of various different ways.

In one aspect, for example, the processor 150 may periodically sample data and/or analog signals from the subsystems 122, 124, 126, 128, 130, the external sensor 132, and/or the cabin sensor 134, and/or may be notified by the respective subsystems and/or sensors when new data is available, etc. In another aspect, the processor 150 may be used in combination with other data processors and/or controllers.

In one aspect, the processor 150 may receive data from one or more of the subsystems 122, 124, 126, 128, 130, the external sensor 132, and/or the cabin sensor 134 via a system bus such as a controller area network (CAN) bus. In other embodiments, the processor 150 may receive data from one or more of the subsystems 122, 124, 126, 128, 130, the external sensor 132, and/or the cabin sensor 134 via a wireless link, such as a Bluetooth link. In another aspect, the processor 150 may collect data using a mix of interface and/or bus types (e.g., a Bluetooth interface to receive data from the external sensor 132 and the cabin sensor 134, and a CAN bus to receive data from the subsystems 122, 124, 126, 128, 130).

In one aspect, where one or more of the subsystems 122, 124, 126, 128, 130, the external sensor 132, and/or the cabin sensor 134 generates analog signals, either the respective sensors/subsystems and/or the processor 150 may convert the analog information to a digital format. Moreover, the processor 150 may convert data received from one or more of the subsystems 122, 124, 126, 128, 130, the external sensor 132, and/or the cabin sensor 134, to different digital formats or protocols.

After collecting and/or converting the data collected from the various sensors and/or subsystems, the processor 150 may store the data in a memory 152 as sensor data 154. In one aspect, the sensor data 154 may be stored together with a time stamp indicating the time and/or date of collection of the sensor data 154. The memory 152 may be any suitable type of data storage, such as a random access memory (RAM), a flash memory, a hard drive memory, or any other tangible, nontransitory computer-readable medium. In one aspect, the memory 152 may be used in combination with other memories.

In one aspect, the processor 150 also, or instead, may collect information directly by detecting a manual input by an operator of the electric vehicle 20. For example, the processor 150 may directly detect when a human driver has performed a particular operation, such as applying the brakes, turning the steering wheel, pressing a button or toggling a switch to turn on a fully automated/machine driving mode, a semi-automatic driving mode, etc. In such embodiments, the mechanisms and/or circuits that allow detection of the manual inputs may be viewed as portions of one or more of the subsystems 122, 124, 126, 128, and/or 130. For example, a physical button and/or switch having a state that indicates whether an operator has turned on a conventional cruise control system may be viewed as a part of the velocity subsystem 124.

References below to data, signals, or other information provided by the subsystems 122, 124, 126, 128, and/or 130 may encompass, in one aspect, direct indicators of operations performed manually by a human driver. Similarly, in scenarios where operation of the electric vehicle 20 is fully or partially machine-controlled, references below to information provided by the subsystems 122, 124, 126, 128, and 130 may encompass direct indicators of operations performed automatically by the processor 150.

After storing the data from the various sensors and/or subsystems in the memory 152, the processor 150 may execute a risk determination module 156 stored in the memory 152 to analyze the sensor data 154, and store results relating to that analysis in the memory 152 as risk data 158. The risk determination module 156 may include a set of instructions stored in the memory 152 to perform the following functions.

In one aspect, execution of the risk determination module 156 causes the processor 150 to determine if the driver exhibits aggressive driving behaviors by analyzing the acceleration, braking, and/or number of times the vehicle exceeded the speed limit, etc. In one aspect, execution of the risk determination module 156 may cause the processor 150 to identify an accident by processing data from velocity subsystem 124 to identify a very sudden change in velocity of electric vehicle 20, and/or by implementing image/video processing of the data from the external sensor 132 to identify a collision with another vehicle and/or object, etc.

In one aspect, the processor 150 may execute the risk determination module 156 to analyze data from the various sensors and/or subsystems substantially in real-time (e.g., as the data is collected by the processor 150) in order to generate risk indicators reflecting the level of risk associated with the environment in which the electric vehicle 20 is driven, the operation of the electric vehicle 20, the condition of the electric vehicle 20, and/or the behavior of the driver and/or passengers of the electric vehicle 20.

Examples of ways in which the risk indicators may be determined, and of the types of correlation models and/or data that may be used to determine the risk indicators, are discussed below in connection with the computer system of the insurer 16. Once each risk indicator is generated for a particular time period, the risk indicator may be stored in the memory 152 as part of the risk data 158, and the sensor data 152 in memory 152 that corresponds to that same time period may be erased to make room for new sensor data. In this manner, the storage requirements of the memory 152 may be reduced, which may be useful in view of the large volume of data that may be generated by one or more of the subsystems 122, 124, 126, 128, 130, the external sensor 132, the cabin sensor 134, and/or other vehicle sensors and subsystems.

The electric vehicle 20 may include a user interface 159 having a display 160 and/or an input device 162. The user interface 159 may be affixed to the inside of the cabin of the electric vehicle 20, for example, on the dashboard, or may be configured as part of a portable computer such as a mobile phone. In one aspect, the display 160 may be used to display the results of the risk determination module 156 to the driver of the electric vehicle 20. In another aspect, the display 160 may display information transmitted from the insurer 16 to the electric vehicle 20 over the electrical grid 12. The input device 162 may be used by the driver to input information for storage in the memory 152 and/or for inputting instructions for controlling the various sensors and/or subsystems. In one aspect, the display 160 and the input device 162 may be combined in the form of a touch screen.

B. Exemplary Communication Systems

When the electric vehicle 20 is connected to the electrical grid 12 for charging the battery 110, a power-line communication unit 170 included in the electric vehicle 20 may obtain the sensor data 154, the risk data 158, and/or other insurance risk related data stored in the memory 152 and transmit it over the electrical grid 12 to the insurer 16 and/or another remote entity. The power-line communication unit 170 may operate by adding a modulated carrier signal (e.g., a radio frequency signal) to an AC power line 171 extending between the power supply inlet 116 and the AC to DC converter 20 of the electric vehicle 20.

The modulated carrier signal may include information representing the sensor data 154, the risk data 158, and/or other insurance risk related data stored in the memory 152. The modulated carrier signal may be transmitted together with the AC voltage over the electrical grid 12 to distant locations, such as the insurer 16. In one aspect, the power-line communication unit 170 may be configured as a Broadband Over Power Line (BPL) modem that transmits modulated carrier signals having a frequency in the range of approximately (e.g., ±10%) 1 to 100 MHz, or 1.6 to 80 MHz, or 10 to 80 MHz, or 20 to 60 MHz, or lesser or greater.

The processor 150 may execute a power-line communication module 172 stored on the memory 152 for controlling the transmission of data by the power-line communication unit 170. As described below in more detail, executing the power-line communication module 172 may involve the processor 150 identifying that the power supply inlet 116 is connected to the electrical plug 118, for example, when the battery 110 is being charged.

In one aspect, the processor 150 may receive a signal from the battery 110 indicating that the battery 110 is being supplied with electricity. In another aspect, the processor 150 may receive a signal, via the power-line communication unit 170, from the insurer 16 requesting transmission of the sensor data 154, the risk data 158, and/or other insurance risk related data stored in the memory 152.

In another aspect, the insurer 16 may be notified by an electric utility company that the electric vehicle 20 is connected to the electrical grid 12 for charging, and the insurer 16 may subsequently transmit a signal to the electric vehicle 20 requesting transmission of the sensor data 154, the risk data 158, and/or other insurance risk related data stored in the memory 152. The reception of the battery charging signal and/or the data request signal from the insurer 16 may cause the processor 150 to transmit the sensor data 154, the risk data 158, and/or other insurance risk related data stored in the memory 152 to the power-line communication unit 170, or cause the power-line communication unit 170 to directly retrieve the sensor data 154, the risk data 158, and/or other insurance risk related data from the memory 152. Once in possession of the sensor data 154, the risk data 158, and/or other insurance risk related data, the power-line communication unit 170 may convert the data into a modulated carrier signal (e.g., a radio frequency signal) that may be transmitted over the electrical grid 12 to the insurer 16.

In one aspect, the charging device 40 may include a switch 180, a charging control portion 182, and a power-line communication unit 184. The charging control portion 182 may selectively control the switch 180 to connect the electrical plug 118 to the electrical grid 12 and/or disconnect the electrical plug 118 from the electrical grid 12. In another aspect, the power-line communication unit 184 may receive a signal from an electric utility company indicating that the charging control portion 182 should disconnect the electrical plug 118 from the electrical grid 12 due to, for example, excessive demand on the electrical grid 12 from consumers. Additionally, the power-line communication unit 184 may receive a signal from the electric utility company indicating that the charging control portion 182 should connect the electrical plug 118 to the electrical grid 12 to charge the battery 110 due to low demand on the electrical grid 12 (e.g., during the evening).

In one aspect, the insurer 16 may possess a power-line communication unit 190 connected to the electrical grid 12 for receiving the sensor data 154, the risk data 158, and/or other insurance risk related data stored that is transmitted from the power-line communication unit 170 of the electric vehicle 20. As discussed below in more detail, the insurer 16 may have a data analysis unit 192 for analyzing the sensor data 154, the risk data 158, and/or other insurance risk related data transmitted from the electric vehicle 20 to determine risk indicators and/or an insurance rating for the driver of the electric vehicle 20 based upon the operation and/or condition of the electric vehicle 20, the behavior of the driver and/or passengers, and/or the environment in which the electric vehicle 20 is operated. The insurer 16 may transmit the risk indicators, the insurance ratings, and/or other data (e.g., advertisements) via the power-line communication unit 190 over the electrical grid 12 to the power-line communication unit 170 of the electric vehicle 20, so that such information may be displayed on the display 160 of the user interface 159 to the driver and/or other occupants of the electric vehicle 20.

IV. Exemplary Insurance Rating Determination System

In one aspect, the data analysis unit 192 of the insurer 16 may be capable of performing various functions, including analyzing the sensor data 154, the risk data 158, and/or other insurance risk related data received from the electric vehicle 20 over the electrical grid 12. The data analysis unit 192 may be distributed across one or more computer systems (e.g., servers) which are remote from the electric vehicle 20 and which may be owned and/or operated by the insurer 16 and/or other entities.

The power-line communication unit 190 of the insurer 16 may be configured to receive the sensor data 154, the risk data 158, and/or other insurance risk related data transmitted from the electric vehicle 20 over the electrical grid 12, and/or store the received data in a memory 194 as collected vehicle data 196. The power-line communication unit 190 may be configured in a similar manner as the power line communication unit 170 discussed above including being configured as BPL modem. The memory 194 may be any suitable type of data storage, such as a RAM, a flash memory, a hard drive memory, or any other tangible, non-transitory computer-readable medium. The memory 194 may be part of the data analysis unit 194, as illustrated in FIG. 2, or configured separately from the data analysis unit 194. In one aspect, the memory 194 may be used in combination with other memories. The data analysis unit 192 may include at least one processor 198 which is configured to process the collected vehicle data 196 for various purposes as discussed below in more detail.

The data analysis unit 192 may include a risk determination module 200 and/or additional modules not illustrated in FIG. 2. The risk determination module 200 may include a set of instructions stored in the memory 194 and capable of being executed by the processor 198.

In one aspect, the data analysis unit 192 may include a driver identification module that, when executed by the processor 198, analyzes the collected vehicle data 196 to determine the identity of the driver of the vehicle 20. If the identity of the driver was previously embedded in the collected vehicle data 196 by the vehicle 20 (e.g., based on information collected by the vehicle 20 from a key fob used by the driver), the driver identification module may pull the identity information directly from the collected vehicle data 196. If the identity of the driver was not previously embedded in the collected vehicle data 196, the driver identification module may be executed to compare the collected vehicle data 196 with historical data indicating the past driving behavior of a plurality of drivers. Based upon the historical data that most closely resembles the collected vehicle data 196, the driver identification module may determine the identity of the driver of the vehicle 22 that is associated with the collected vehicle data 196.

In one aspect, the processor 198 may execute the risk determination module 200 to generate risk indicators based upon the collected vehicle data 196. For example, the risk determination module 200 may generate risk indicators in an embodiment (not illustrated) where the risk determination module 156 of the electric vehicle 20 is omitted. Alternatively, where the electric vehicle 20 generates risk indicators with the risk determination module 156, the risk determination module 200 may not determine risk indicators. In one aspect, where the risk determination module 156 of the electric vehicle 20 determines risk indicators, the risk determination module 200 may further process the risk indicators in order to generate other indicia of risk (e.g., to generate monthly risk indicators based upon per-minute or per-day risk indicators that are provided by the electric vehicle 20).

Risk indicators may be determined using predictive modeling, which may use the collected vehicle data 196, as well as, correlation data 202 stored by the insurer 16. The correlation data 202 may be accessed by the risk determination module 200 and/or other modules within the data analysis unit 192.

In one aspect, similar correlation data may be stored, or stored in part, by the memory 152 of the electric vehicle 20. The correlation data 202 may be generated based upon historical data associated with the electric vehicle 20 and/or other vehicles. In another aspect, the correlation data 202 may include data modeling correlations between: (a) patterns relating to vehicle operation as represented by sensors and/or vehicle subsystems monitoring vehicle operation, patterns relating to external conditions sensed by external vehicle sensors, patterns related to conditions inside the vehicle as sensed by cabin sensors, and/or patterns related to diagnostic data of the vehicle; and (b) likelihoods of incurring recognizable losses under a vehicle insurance policy. The correlation data/models stored in the correlation data 202 may be based upon manually entered information and/or may be learned by the insurer 16 (and/or other computer system(s) not depicted in FIG. 2) based upon operation and/or claims data of other vehicles.

The risk determination module 200 may be configured to analyze the collected vehicle data 196 using the correlation data 202 to determine one or more risk indicators. As an example in which a relatively simple correlation model is used, the risk determination module 200, when executed by the processor 198, may compare the percentage of time, within a predetermined time period, that the electric vehicle 20 was operated in a fully automated/machine driving mode (e.g., as determined based upon data generated by one or more of the subsystems 122, 124, 126, 128, and 130) with one or more percentage ranges identified by the correlation data (e.g., 0-10 percent, 11-25 percent, etc.), and/or determine, for that time period, the risk indicator that corresponds to the matching percentage range. The correlation data 202 may include a relational database, for example, with each percentage range corresponding to a different indicator of a likelihood of loss.

As another example utilizing a slightly more complex correlation model, the risk determination module 200 may process data from the velocity subsystem 124 and data from the external sensor 132 to determine the average velocity of the electric vehicle 20, and/or the average following distance between the electric vehicle 20 and vehicles on the road ahead of the electric vehicle 20, over a particular time period. Once the average velocity and the average following distance are determined, the risk determination module 200 may compare those quantities with velocity/following distance models represented by the correlation data 202, and/or identify, for that time period, a risk indicator that corresponds to the average velocity/following distance of the electric vehicle 20.

More generally, the risk determination module 200 may process data collected by one or more of the subsystems 122, 124, 126, 128, 130, the external sensor 132, and the cabin sensor 134, and/or other vehicle sensors and subsystems to determine when the electric vehicle 20 crossed lane markers, was not operated in conformance with traffic lights or traffic signs, was driven at erratic velocities, was driven with excessive braking, and/or was otherwise driven in any other manner that has previously been determined (e.g., by the insurer 16) to correspond to a higher (or lower) risk of accident/loss, or to determine when the electric vehicle 20 was driven in low-visibility conditions (e.g., rainy or snowy weather), in a high-traffic environment (e.g., an urban area), on streets in disrepair (e.g., bumpy, full of pot holes, etc.), and/or in any other conditions external to the electric vehicle 20 that have previously been determined to correspond to a higher (or lower) risk of accident/loss.

Each risk indicator may include a single value or code, or a plurality of risk indices. In one aspect, for example, a monthly risk indicator may include risk indices that are generated each hour (or each hour when the electric vehicle 20 is operated, etc.), and a monthly rating and premium are determined based upon all of the hourly risk indices generated for their respective month. The hourly risk indices may be weighted (e.g., according to the amount of time that the electric vehicle 20 was driven during that hour), or raw risk indices may be used to determine the insurance rating and/or insurance premium. In a situation where the electric vehicle 20 is driven by an individual not yet insured by the insurer 16, the risk indicators may be used to determine an insurance rating and corresponding insurance premium to be offered to the individual.

Once the risk indicators are determined by the risk determination module 200 and/or the risk determination module 156, the risk indicators may be provided to an insurance rating module 204, which may be part of the data analysis unit 194 and/or another computer system, and which may include a set of instructions capable of causing the processor 198 to determine an insurance rating for a driver of the electric vehicle 20 based upon the risk indicators. For example, in an embodiment where the risk determination module 200 and/or the risk determination module 156 generates periodic (e.g., weekly, monthly, etc.) risk indicators, the insurance rating module 204 may determine an insurance rating corresponding to one or more of the risk indicators (e.g., a monthly insurance rating corresponding to a monthly risk indicator, a monthly insurance rating corresponding to a set of tens or hundreds of hourly risk indicators, an annual insurance rating corresponding to a set of weekly risk indicators, etc.).

The insurance ratings may in turn be provided to a billing unit (not shown) that is configured to determine premiums for an insurance policy of the driver of the electric vehicle 20, and/or an insurance policy associated with the electric vehicle 20 itself, based upon the insurance ratings (or, alternatively, based directly on the risk indicators). In one aspect, where the risk determination module 200 and/or the risk determination module 156 generates monthly risk indicators, and where the insurance rating module 204 determines corresponding monthly insurance ratings, the billing unit may determine a monthly insurance premium corresponding to each monthly insurance rating.

In one aspect, after determining the insurance rating and/or insurance premium, the insurer 16 may transmit data indicative of the insurance rating and/or insurance premium via the power line communication unit 190 over the electrical grid 12 to the power-line communication unit 170 of the electric vehicle 20. The electric vehicle 20 may store this data in its memory 152 and/or display this data to the driver of the electric vehicle 20 via the display 160 of the user interface 159.

V. Exemplary Method of Communicating Data with an Electric Vehicle

Figure 3:
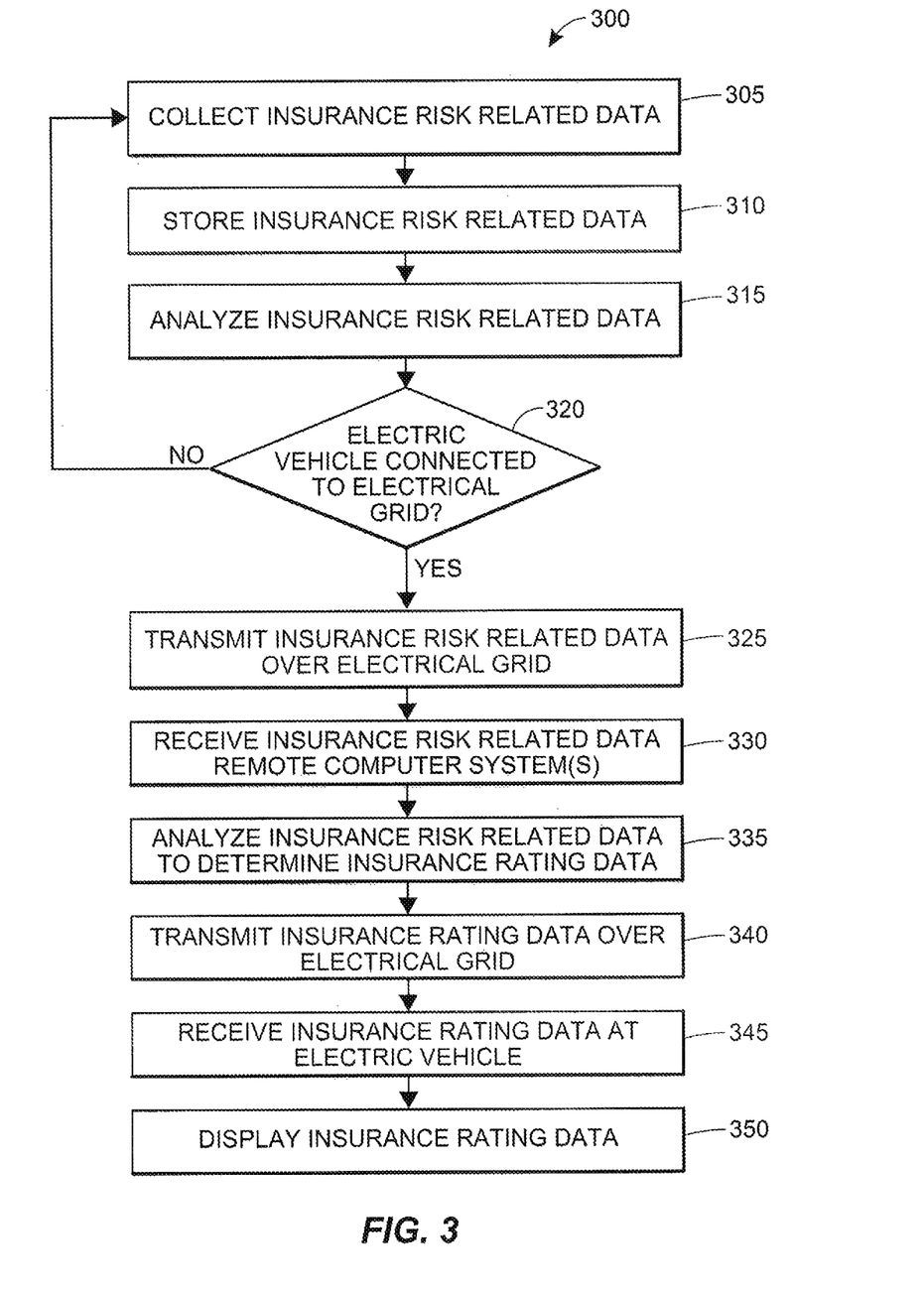
FIG. 3 is a flow chart of an exemplary method of communicating insurance risk related data with an electric vehicle in accordance with principles of the present disclosure.

FIG. 3 is a flow diagram of an exemplary method 300 of communicating insurance risk related data with, and/or from, an electric vehicle. In one aspect, the method 300 may be implemented, in whole or in part, on one or more devices or systems such as the electric vehicle 20 of FIGS. 1 and 2. Alternatively, or additionally, in one aspect, the method 300 may be implemented, in whole or in part, by the charging device 40 and/or the insurer 16 of FIGS. 1 and 2. For instance, the method may be implemented—either alone or in combination—by the electric vehicle 20, charging device 40, and/or an insurance provider remote processor or server. In one aspect, the method may be saved as a set of instructions, routines, programs, and/or modules on a memory such as the memory 152 and/or the memory 194 shown in FIG. 2.

The method 300 may begin with collecting insurance risk related data and/or other data from one or more of the subsystems 122, 124, 126, 128, 130, the external sensor 132, the cabin sensor 134, and/or other vehicle sensors and subsystems (block 305). In one aspect, the vehicle control unit 149 may collect the insurance risk related data during operation of the electric vehicle 20 (e.g., while the electric vehicle is being driven) and/or after the electric vehicle 20 has been stopped and turned OFF. The processor 150 may execute a data collection module stored in the memory 152 of the vehicle control unit 149 to collect the insurance risk related data.

The insurance risk related data may include any one of, or any combination of, odometer information, steering information, acceleration information, braking information, velocity information, engine performance information, vehicle maintenance information, proximity information, drifting information, lane changing information, weather information, driver behavior information, passenger information, geographic location information, and/or any other type of information associated with use of the electric vehicle 20. The insurance risk related data may also include any one of, or any combination of, the types of information discussed above in connection with the subsystems 122, 124, 126, 128, 130, the external sensor 132, and/or the cabin sensor 134.

After collecting the insurance risk related data, the insurance risk related data may be stored in one or more memories included in the electric vehicle 20, such as the memory 152 (block 310). The sensor data 154 stored in the memory 152 may be formed, in whole or in part, by the insurance risk related data collected from one or more of the subsystems 122, 124, 126, 128, 130, the external sensor 132, the cabin sensor 134, and/or other vehicle sensors and subsystems.

In one aspect, where one or more of the subsystems 122, 124, 126, 128, 130, the external sensor 132, and/or the cabin sensor 134 may generate analog signals, the method 300 may involve converting the analog information to a digital format with the respective sensors/subsystems and/or with the processor 150 of the vehicle control unit 149. Moreover, the processor 150 may convert the insurance risk related data received from one or more of the subsystems 122, 124, 126, 128, 130, the external sensor 132, and/or the cabin sensor 134, to different digital formats or protocols prior to storing the insurance risk related data in the memory 152.

After storing the insurance risk related data, the processor 150 may execute the risk determination module 156 stored in the memory 152 to analyze the sensor data 154, and store results relating to that analysis in the memory 152 as part of the risk data 158 (block 315). As discussed above, the risk determination module 156 may include a set of instructions stored in the memory 152 to cause the processor 150 to determine if the driver exhibits aggressive driving behavior(s) by analyzing the acceleration, braking, and/or number of times the vehicle exceeded the speed limit, etc. In another aspect, execution of the risk determination module 156 may cause the processor 150 to identify an accident by processing data from the velocity subsystem 124 to identify a very sudden change in velocity of the electric vehicle 20, and/or by implementing image/video processing of the data from external sensor 132 to identify a collision with another vehicle and/or object, etc.

In one aspect, the processor 150 may execute the risk determination module 156 to analyze the sensor data 154 substantially in real-time in order to generate risk indicators reflecting the level of risk associated with the environment in which the electric vehicle 20 is driven, the operation of the electric vehicle 20, the condition of the electric vehicle 20, the behavior of the driver of the electric vehicle 20, and/or the behavior of the passengers of the electric vehicle 20. Once each risk indicator is generated for a particular time period, the risk indicator may be stored in the memory 152 as part of the risk data 158, and the sensor data 154 that corresponds to that same time period may be erased to make room for new senor data. In this manner, the storage requirements of the memory 152 may be reduced, which may be useful in view of the large volume of data that may be generated by one or more of the subsystems 122, 124, 126, 128, 130, the external sensor 132, the cabin sensor 134, and/or other vehicle sensors and subsystems. As an alternative, in another aspect, the step of generating the risk data 158 may be omitted from the method 300.

While the foregoing generally refers to the insurance risk related data as being a separate item from the sensor data 154 and/or the risk data 158, it should be understood that the insurance risk related data may encompass the sensor data 154 and the risk data 158, as well as, other types of data.

Next, the method 300 may involve determining whether the electric vehicle 20 is connected to the electrical grid 12 for charging the battery 110 of the electric vehicle 20 (block 320). In one aspect, this step may involve the vehicle control unit 149 receiving an indication (e.g., a signal) from the battery 110 that the battery 110 is being charged, an indication (e.g., a signal) from the power supply inlet 116 that the power supply inlet 116 is electrically connected to the electrical plug 118, an indication (e.g., a signal) from the power-line communication unit 170 that the power-line communication 170 is configured to transmit and/or receive information over the electrical grid 12, and/or an indication (e.g., a signal) from the AC to DC converter 120 that the AC to DC converter 120 is supplied with electricity from the electrical grid 12. If the vehicle control unit 149 determines that the electric vehicle 20 is not connected to the electrical grid 12, the method 300 may return to block 305 to collect additional insurance risk related data. On the other hand, if the vehicle control unit 149 determines that the electric vehicle 20 is connected to the electrical grid 12, the method 300 may proceed to block 325 to transmit the insurance risk related data over the electrical grid 12.

In response to the indication that the electric vehicle 20 is connected to the electrical grid 12, the processor 150 may execute a set of instructions stored in the power-line communication module 172 to control the power-line communication unit 170 to transmit the insurance risk related data over the electrical grid 12 to the computer system(s) of the insurer 16 and/or another remote entity (block 325). In one aspect, prior to transmission, the electric vehicle 20 may receive a request from the insurer 16, via the power-line communication unit 170, to transmit the insurance risk related data to the insurer 16. The insurer 16 may know that the electric vehicle 20 is capable of receiving such a request over the electrical grid 12 as the result of an electric utility company notifying the insurer 16 that the electric vehicle 20 is exerting a demand for power on the electrical grid 12.

In one aspect, a remote server operated by the insurer 16 may periodically check if the electric vehicle 20 is connected to the electrical grid 12, at times when the electric vehicle 20 is expected to be charging (e.g., every night at midnight, every day at 2:00 p.m., etc.). The insurer 16 may check if the electric vehicle 20 is connected to the electrical grid 12 by pinging an address where the electric vehicle 20 is customarily charged and/or by contacting an electric utility company to determine if they are aware of the electric vehicle 20 being charged. Upon confirming that the electric vehicle 20 is connected to the electrical grid 12 for charging, the insurer 16 may send a request to the electric vehicle 20 over the electrical grid 12 asking the electric vehicle 20 to transmit the insurance risk related data. The request may indicate a collection time frame for the insurance risk related data to be transmitted (e.g., insurance risk related data collected over the past day, week, month, etc.) and/or may indicate that all insurance risk related data collected since the last transmission should be transmitted to the insurer 16. Reception of the request from the insurer 16 may cause the processor 150 of the electric vehicle 12 to execute the power-line communication module 172, as discussed below, and transmit the insurance risk related data with, or from, the power-line communication unit 170 over the electrical grid 12 to the insurer 16.

In one aspect, execution of the power-line communication module 172 may cause the processor 150 to transmit the sensor data 154, the risk data 158, and/or other insurance risk related data stored in the memory 152 to the power-line communication unit 170 and/or may cause the power-line communication unit 170 to retrieve the sensor data 154, the risk data 158, and/or other insurance risk related data directly from the memory 152.

Once in possession of the insurance risk related data, the power-line communication unit 170 may convert the insurance risk related data into a modulated carrier signal (e.g., a radio frequency signal) that may be transmitted over the electrical grid 12 to the insurer 16. In one aspect, where the power-line communication unit 170 is configured as a BPL modem, the power-line communication unit 170 may convert the insurance risk related data into a modulated carrier signal having a frequency in the range of approximately (e.g., ±10%) 1 to 100 MHz, or 1.6 to 80 MHz, or 10 to 80 MHz, or 20 to 60 MHz, or lesser or greater.

The insurer 16 may receive the carrier signal representing the insurance risk related data with the power-line communication unit 190 (block 330). The power-line communication unit 190, which may be configured as a BPL modem, may convert the modulated carrier signal into digital data that may be stored in the memory 194 of the data analysis unit 192 as part of the collected vehicle data 196. Subsequently, the insurer 16 may analyze the collected vehicle data 196 by executing instructions included in the risk determination module 200 and/or the insurance rating module 204 to generate risk indicators and/or insurance rating data (block 335). The risk determination module 200 and/or the insurance rating module 204 may operate in the manner discussed above to generate the risk indicators and/or the insurance rating data. In one aspect, the insurance rating data may correspond to the likelihood that the electric vehicle 20 and/or the driver of the electric vehicle 20 may be involved in an accident causing damage or injury to the electric vehicle 20, the driver of the electric vehicle 20, passengers of the electric vehicle 20, other vehicles, other drivers and passengers, pedestrians, etc. Additionally, or as an alternative, the insurance rating data may correspond to a risk category for the electric vehicle 20 and/or the driver of the electric vehicle 20 (e.g., high risk, moderate risk, low risk, etc.).

In one aspect, the insurance rating data may be provided to a billing unit (not illustrated) that is configured to determine premiums for an insurance policy of the driver of the electric vehicle 20, or an insurance policy associated with the electric vehicle 20, based upon the insurance rating data (or, alternatively, based directly on the risk indicators), as discussed above. Also, the insurance rating data may or may not include the insurance premium information.

After the insurance rating data has been calculated, the insurer 16 may transmit the insurance rating data and/or other data (e.g., advertisements, warning information, etc.) over the electrical grid 12 to the electric vehicle 20 (block 340). This step may involve using the power-line communication unit 190 to convert the insurance rating data and/or other data into a modulated carrier signal having a frequency in the range of approximately (e.g., ±10%) 1 to 100 MHz, or 1.6 to 80 MHz, or 10 to 80 MHz, or 20 to 60 MHz, or lesser or greater. Subsequently, the power-line communication unit 170 of the electric vehicle may receive the modulated carrier signal and/or convert the modulated carrier signal into digital data that may be stored in the memory 152 (block 345). Finally, in one aspect, the display of the 160 of the user interface 159 may display the insurance rating data (e.g., the insurance premium information calculated by the insurer 16) and/or other data to the driver and/or other occupants of the electric vehicle 20 (block 350).

The information which may be communicated to the vehicle 20 via the power-line communication system is not limited to insurance rating data, and may be any type of information. In one aspect, a vehicle manufacturer and/or the insurer 16 may communicate, via the power-line communication, warranty and/or recall information to the vehicle 20 for display to the driver and/or software updates for updating the computer systems of the vehicle 20. Accordingly, the power-line communication system of the present disclosure may be used to keep the driver aware of the latest safety information relevant to the vehicle 20 and/or provide support for the software used by the vehicle 20.

VI. Exemplary Computer-Implemented Method

In one aspect, a computer-implemented method of communicating data with an electric vehicle may be provided. The method may include (a) collecting, at or via one or more vehicle-mounted processors, insurance risk related data associated with use of the electric vehicle; (b) storing, at or via the one or more vehicle-mounted processors, the insurance risk related data in one or more memories included in the electric vehicle; (c) receiving, at or via the one or more vehicle-mounted processors, an indication that the electric vehicle is connected to an electrical grid for charging a battery included in the electric vehicle; and/or (d) transmitting, the insurance risk related data with, or from, a power-line communication unit, and/or under the direction or control of the one or more vehicle-mounted processors, over the electrical grid to one or more remote computer systems when the electric vehicle is connected to the electrical grid for charging the battery to facilitate insurance product pricing that is more reflective of actual risk. The insurance risk related data may include odometer information, steering information, acceleration information, braking information, velocity information, engine performance information, vehicle maintenance information, proximity information, drifting information, lane changing information, weather information, driver behavior information, passenger information, and/or geographic location information. The insurance risk related data may be collected from one or more sensors included in the electric vehicle. Also, the power-line communication unit may be a broadband over power line (BPL) modem. The method may include additional, fewer, or alternate actions, including those discussed elsewhere herein.

The method discussed above and herein may further include determining, with the one or more remote computer systems, insurance rating data based upon the insurance risk related data. Additionally, the method may include receiving, with or via the power-line communication unit and/or the one or more vehicle-mounted processors, insurance rating data transmitted over the electrical grid from the one or more remote computer systems. In one aspect, the method includes displaying, to a driver of the electric vehicle, a notification based upon the insurance rating data.

The method discussed above and herein may include, prior to transmitting the insurance risk related data, receiving, with the power-line communication unit, a request to transmit the insurance risk related data transmitted over the electrical grid to an insurance provider.

VII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In exemplary implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for communication data with an electric vehicle through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the foregoing text sets forth a detailed description of numerous different implementations, it should be understood that the legal scope of the invention is defined by the words of the claims set forth at the end of this patent. The detailed description is to be construed as exemplary only and does not describe every possible implementation, as describing every possible implementation would be impractical, if not impossible. One could implement numerous alternate configurations, using either current technology or technology developed after the filing date of this patent, which would still fall within the scope of the claims.

What is claimed is:

1. A computer-implemented method of communicating data with an electric vehicle, the method comprising:
    collecting, at one or more vehicle-mounted processors, sensor data from one or more sensors coupled to the one or more vehicle-mounted processors, the sensor data being associated with use of the electric vehicle;
    analyzing, at the one or more vehicle-mounted processors and according to insurance data stored at the electric vehicle, the sensor data to generate one or more risk indicators representative of a level of risk associated with at least one of an environment in which the electric vehicle is operated, an operation of the electric vehicle, a condition of the electric vehicle, a behavior of a driver of the electric vehicle, or a behavior of a passenger of the electric vehicle, wherein the insurance data relates to a likelihood of incurring a loss under an insurance policy;
    storing, at or via the one or more vehicle-mounted processors, the one or more risk indicators in one or more memories included in the electric vehicle;
    receiving, at or via the one or more vehicle-mounted processors, an indication that the electric vehicle is connected to an electrical grid for charging a battery included in the electric vehicle;
    receiving, with a power-line communication unit and directly from the electrical grid, a request to transmit the one or more risk indicators over the electrical grid; and
    in response to the request, transmitting the one or more risk indicators with, or from, the power-line communication unit, and/or under the direction or control of the one or more vehicle-mounted processors, over the electrical grid to one or more remote computer systems when the electric vehicle is connected to the electrical grid for charging the battery.

2. The method of claim 1, the one or more risk indicators including at least one of: odometer information, steering information, acceleration information, braking information, velocity information, engine performance information, vehicle maintenance information, proximity information, drifting information, lane changing information, weather information, driver behavior information, passenger information, or geographic location information.

3. The method of claim 1, comprising determining, with the one or more remote computer systems, insurance rating data based upon the one or more risk indicators.

4. The method of claim 1, comprising receiving, with or via the power-line communication unit and/or the one or more vehicle-mounted processors, insurance rating data transmitted over the electrical grid from the one or more remote computer systems.

5. The method of claim 4, comprising displaying, to a driver of the electric vehicle, a notification based upon the insurance rating data.

6. The method of claim 1, wherein the request is received from an insurance provider.

7. The method of claim 1, wherein the one or more sensors are included in the electric vehicle.

8. The method of claim 1, the power-line communication unit being a broadband over power line (BPL) modem.

9. A system of communicating data with an electric vehicle, the system comprising:
    one or more vehicle-mounted processors; and
    one or more memories connected to the one or more processors, the one or more memories including non-transitory computer-readable instructions that, when executed by the one or more vehicle-mounted processors, cause the one or more vehicle-mounted processors to:
    collect sensor data from one or more sensors coupled to the one or more vehicle-mounted processors, the sensor data being associated with use of the electric vehicle;
    analyze the sensor data according to insurance data stored at the electric vehicle to generate one or more risk indicators representative of a level of risk associated with at least one of an environment in which the electric vehicle is operated, an operation of the electric vehicle, a condition of the electric vehicle, a behavior of a driver of the electric vehicle, or a behavior of a passenger of the electric vehicle, wherein the insurance data relates to a likelihood of incurring a loss under an insurance policy;

store the one or more risk indicators in the one or more memories;

receive an indication that the electric vehicle is connected to an electrical grid for charging a battery included in the electric vehicle;

receive, with a power-line communication unit and directly from the electrical grid, a request to transmit the one or more risk indicators over the electrical grid; and in response to the request, control the power-line communication unit to transmit the one or more risk indicators over the electrical grid to one or more remote computer systems.

10. The data communication system of claim 9, the one or more risk indicators including at least one of: odometer information, steering information, acceleration information, braking information, velocity information, engine performance information, vehicle maintenance information, proximity information, drifting information, lane changing information, weather information, driver behavior information, passenger information, or geographic location information.

11. The data communication system of claim 9, wherein the non-transitory computer-readable instructions include instructions that cause the one or more vehicle-mounted processors to control a power-line communication unit to receive insurance rating data transmitted over the electrical grid from the one or more remote computer systems.

12. The data communication system of claim 11, wherein the insurance rating data is determined based upon the one or more risk indicators.

13. The data communication system of claim 9, the power-line communication unit being included in a charging unit separate from the electric vehicle.

14. The data communication system of claim 9, wherein the one or more sensors are included in the electric vehicle.

15. The method of claim 9, the power-line communication unit being a broadband over power line (BPL) modem.

16. A non-transitory computer-readable medium including non-transitory computer-readable instructions that, when executed at one or more vehicle-mounted processors of a communication system for an electric vehicle, cause the one or more vehicle-mounted processors to:

collect sensor data from one or more sensors coupled to the one or more vehicle-mounted processors, the sensor data being associated with use of the electric vehicle;

analyze the sensor data according to insurance data stored at the electric vehicle to generate one or more risk indicators representative of a level of risk associated with at least one of an environment in which the electric vehicle is operated, an operation of the electric vehicle, a condition of the electric vehicle, a behavior of a driver of the electric vehicle, or a behavior of a passenger of the electric vehicle, wherein the insurance data relates to a likelihood of incurring a loss under an insurance policy;

store the one or more risk indicators in one or more memories included in the electric vehicle;

receive an indication that the electric vehicle is connected to an electrical grid for charging a battery included in the electric vehicle;

receive, with a power-line communication unit and directly from the electrical grid, a request to transmit the one or more risk indicators over the electrical grid; and in response to the request, transmit the one or more risk indicators with the power-line communication unit over the electrical grid to one or more remote computer systems when the electric vehicle is connected to the electrical grid for charging the battery.

17. The non-transitory computer-readable medium of claim 16, the one or more risk indicators including at least one of: odometer information, steering information, acceleration information, braking information, velocity information, engine performance information, vehicle maintenance information, proximity information, drifting information, lane changing information, weather information, driver behavior information, passenger information, or geographic location information.

18. The non-transitory computer-readable medium of claim 16, wherein the non-transitory computer-readable instructions include instructions that cause the one or more vehicle-mounted processors to control a power-line communication unit to receive insurance rating data transmitted over the electrical grid from the one or more remote computer systems.

19. The non-transitory computer-readable medium of claim 18, wherein the insurance rating data is determined based upon the one or more risk indicators.

20. The non-transitory computer-readable medium of claim 16, wherein the one or more sensors are included in the electric vehicle.

21. The method of claim 1, wherein analyzing, at or via the one or more vehicle-mounted processors, the sensor data to generate the one or more risk indicators comprises comparing the sensor data to correlation data stored at or via the one or more vehicle-mounted processors, and wherein the correlation data comprises a likelihood of incurring the loss under the insurance policy.

22. The method of claim 1, wherein the request defines a collection time period over which the sensor data used to generate the one or more risk indicators was collected.

* * * * *